United States Patent [19]
Khanarian

[11] Patent Number: 5,881,201
[45] Date of Patent: Mar. 9, 1999

[54] BACKLIGHTING LIGHTPIPES FOR DISPLAY APPLICATIONS

[75] Inventor: Garo Khanarian, Berkeley Heights, N.J.

[73] Assignee: Hoechst Celanese Corporation, Somerville, N.J.

[21] Appl. No.: 815,172

[22] Filed: Mar. 11, 1997

[51] Int. Cl.$^6$ ...................................................... G02B 6/10
[52] U.S. Cl. ........................................................... 385/146
[58] Field of Search .................................. 385/140–146, 385/2, 121; 359/245; 600/182, 212, 245, 249; 606/13, 15; 250/227.31, 330, 395, 458.1, 495.1; 349/62, 9, 64, 96

[56] References Cited

U.S. PATENT DOCUMENTS

| | | | |
|---|---|---|---|
| 596,714 | 12/1898 | Russell | 365/106 |
| 3,641,332 | 2/1972 | Teick et al. | 385/142 |
| 4,974,942 | 12/1990 | Gross et al. | 385/2 |
| 5,132,530 | 7/1992 | Groh et al. | 250/227.31 |
| 5,295,048 | 3/1994 | Park et al. . | |
| 5,319,975 | 6/1994 | Pederson et al. | 250/330 |
| 5,440,927 | 8/1995 | Chu et al. | 73/335.01 |
| 5,580,932 | 12/1996 | Koike . | |
| 5,587,816 | 12/1996 | Gunjima et al. | 349/62 |

*Primary Examiner*—Akm E. Ullah
*Attorney, Agent, or Firm*—Palaiyur S. Kalyanaraman

[57] ABSTRACT

This invention discloses improved lightpipes for backlighting applications in liquid crystal display devices. The lightpipes comprise transparent polymers with scattering centers. A preferred composition for such lightpipes comprises a cycloolefin polymer containing scattering centers from suitable elastomers and inorganic fillers. The inventive lightpipes offer superior scattering efficiency as well as spatial uniformity of scattering and uniformity of scattering across a wide wavelength range.

28 Claims, 4 Drawing Sheets

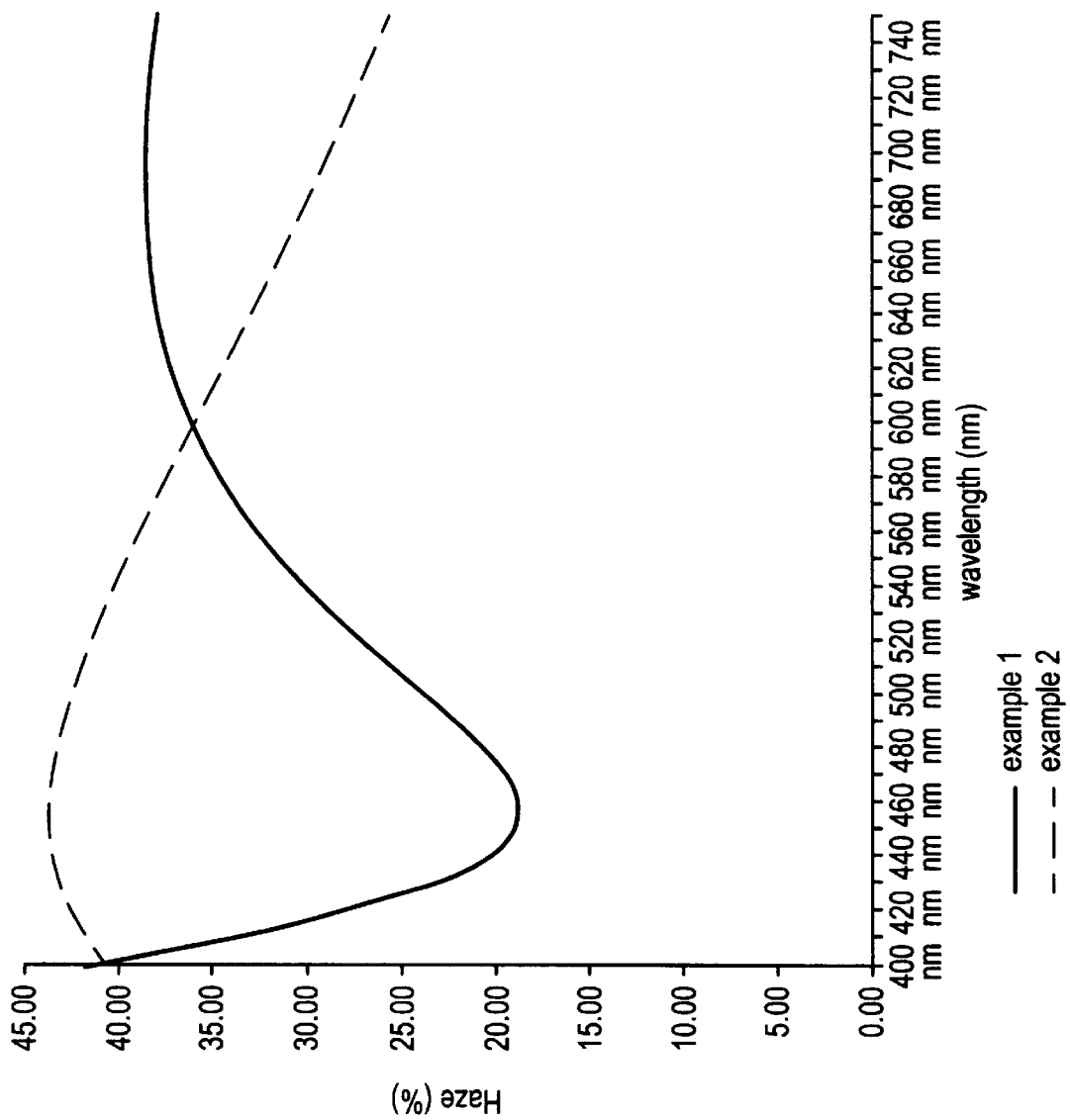

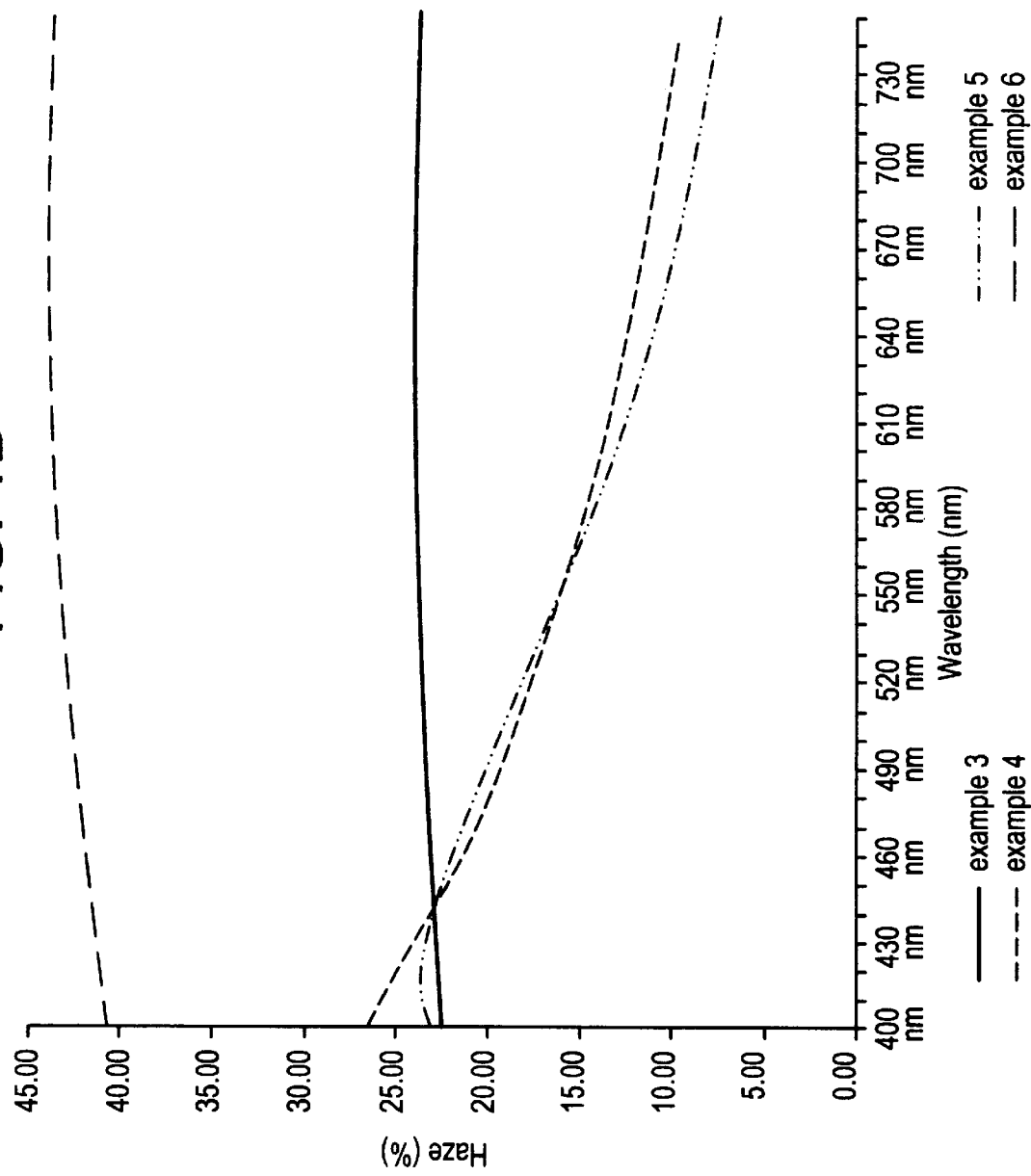

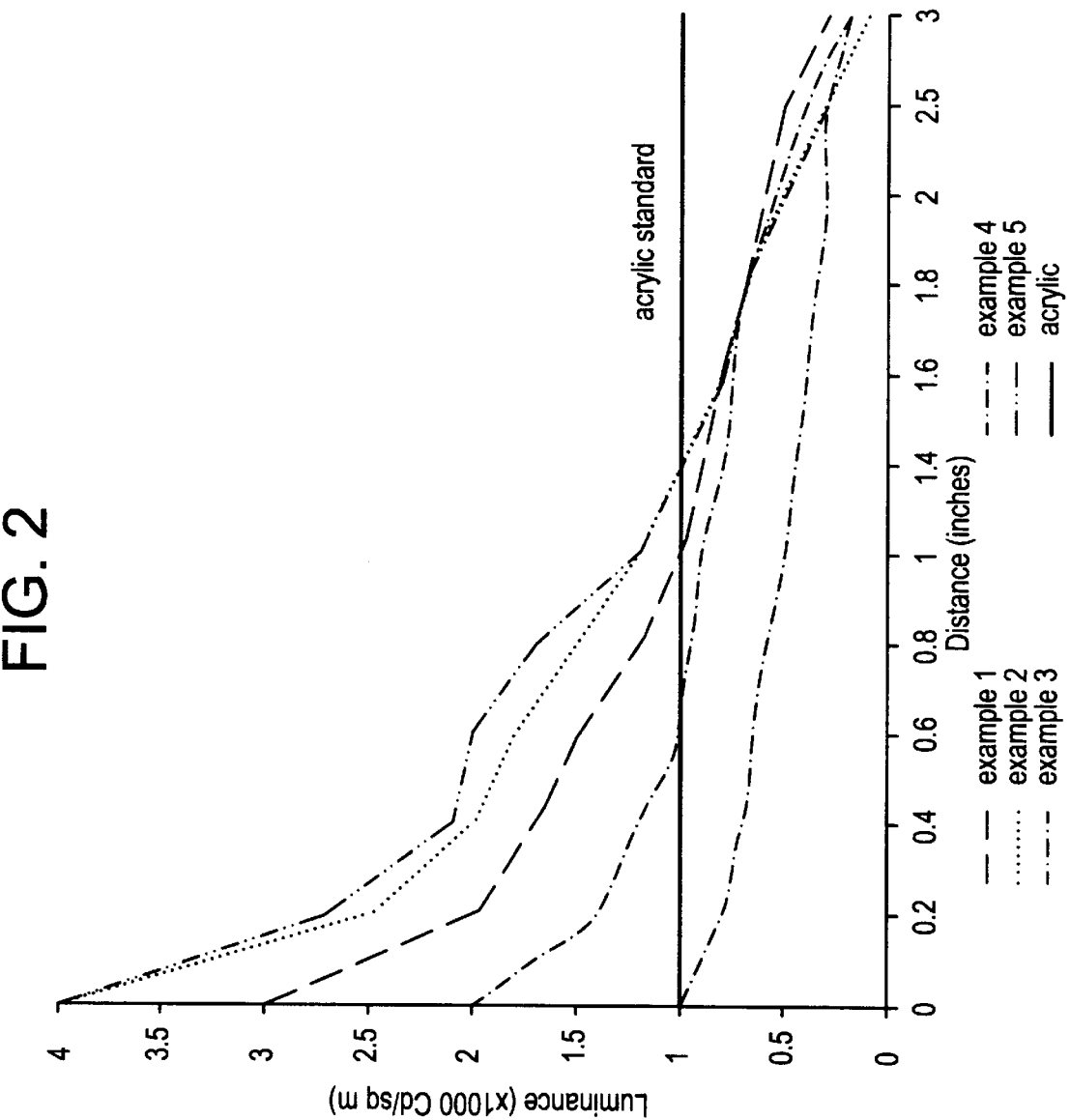

BACKLIGHTING LIGHTPIPES FOR DISPLAY APPLICATIONS

FIELD OF THE INVENTION

This invention generally discloses improved display systems. It specifically discloses improved lightpipes and light diffusion plates containing light scattering polymers and offering enhanced brightness of light suitable for display applications.

BACKGROUND OF THE INVENTION

Liquid crystal displays ("LCDs") are commercially important articles. Such display devices are growing in popularity and utility over the last several years. LCDs operate by modulating external light, either the light from the surroundings (in the reflective mode) or the light from a backlight source (in the transmissive mode). Large displays such as, for example, the flat panel displays of newer televisions and computer screens, use backlight to ensure better performance. In order to have a bright screen, the backlight source has to be quite bright. This is because light from the source passes through several stages before reaching the LCD and tends to lose brightness in this process. Additionally, due to scattering effects light uniformity across the screen is lost. One way to avoid this problem would be to increase the size of the light source. However, this is expensive, increases power consumption and adds to the weight of the overall display system. Thus, there have been several attempts to improve brightness of the light without much loss during transmission.

A typical display system comprises a transparent light guiding plate between the light source and the LCD. There are additional layers such as diffuser, brightness enhancer, reflector and the like. The light source is typically a cold cathode fluorescent lamp ("CCFL") and the light pipe is edge lit. The back side of the transparent plate carries a white dot pattern for causing light scattering by interrupting the total reflection inside the transparent plate. The pitch of the dot pattern or the size of the printed dots is a function of the distance from the primary light source to get a uniform brightness all over the surface area. The light thus scattered inside the plate to achieve uniformity then goes through the diffuser (which hides the dot pattern) and the other layers prior to reaching and lighting the LCD. It is estimated that typically only about 10–20% of the original light from the CCFL reaches the LCD. Attempts to increase brightness have concentrated on improving the efficiency of light scattered within the transparent light guiding plate.

The dots printed on the transparent plate cause the light to scatter. Such scattering centers allow more light to gather internally and improve the efficiency for the light that comes out of the plate. Typically, polymers (such as polymethyl methacrylate, "PMMA") are used as transparent plate materials. The addition of scattering centers would be one way to improve the lighting efficiency and simplifying construction. However, care must be taken not to lose the spatial uniformity of lighting over the lightpipe, and not to lose the color fidelity of the CCFL as a result of non uniform scattering over the wavelength range. Otherwise, the color gamut of the CCFL will appear different in the exit light from the lightpipe.

A. Horibe et al, *Journal of the Society of Information Display*, Vol. 3 (4), 169 (1995) teach the use of polymethyl methacrylate containing centers of a polymer of different refractive index (e.g. polystyrene, polybenzyl methacrylate, poly-2,2,2-trifluoromethyl methacrylate) as light guide materials. The author report that the luminance from such plate is more than 50% brighter than that from conventional PMMA plate system. However that publication does not describe a method of obtaining spatially uniform scattering over the whole of the lightpipe. There is a continuing need for an improved backlight system for display applications.

Light diffusion plates are used widely for lighting applications, the purpose being to provide uniform diffuse lighting. Examples of applications include covers for lighting and also projection display screens. Japanese Patent 6-279604 (Mitsui Petrochemicals Limited, 1994) discloses scattering type cyclic olefin copolymers with fillers for light diffusion plate applications.

U.S. Pat. Nos. 5,521,797, and 5,093,765 disclose uniform lightpipes with printed dots on back surface; European Patent Application Number 95301273.9 (filed Feb. 28, 1995) and U.S. Pat. No. 5,528,720 disclose wedge light pipes, all using clear nonscattering type plastic.

Other disclosures of interest in this regard are U.S. Pat. Nos. 5,346,954; 5,108,857; 5,004,785; 4,963,624; 4,929,523; 4,000,216; 3,992,486; EP Applications 94305105.2 and 92100847.0 and Canadian Application 2,141,919.

It is an object of the present invention to provide an improved backlight system.

It is an additional object of the present invention to provide a backlight system with enhanced brightness and uniformity of colors across the source wavelength range.

It is an additional object of the present invention to provide a backlight system with spatially uniform lighting over the whole length and width of the backlight.

It is an additional object of the present invention to provide a lightpipe material that is mechanically tough and has impact resistance.

It is an additional object of the present invention to provide a light diffusion screen which scatters light uniformly with wavelength and which is mechanically tough It is a further object of this invention to provide a backlight system that is simple to construct using known polymer processing techniques.

These and other objects of the invention will be apparent to those skilled in the art from the following description and examples.

SUMMARY OF THE INVENTION

One or more of the foregoing objects are achieved by the provision in the instant invention of a backlight system which comprises a light source and a light guide. The light guide consists of a sheet which has one (or more) edge where the light from the CCFL enters the light guide (hereinafter called the "entry edge") and a surface where the light, after passing through the light guide, exits (hereinafter called the "exit surface"). The light guide comprises a transparent polymer and a light scattering material. The light scattering material has a different refractive index from the transparent polymer. The light from the light source CCFL scatters substantially internally within the light guide prior to exiting through the exit surface, with said scattering occurring substantially uniform over the wavelength range 400–740 nm. The light exiting through the exit surface is substantially spatially uniform in brightness. Furthermore, the light guides constructed according to this invention possess high toughness. The term "high toughness" refers to Notched Izod of at least 0.5 ft-lb/inch, as measured by standard methods described later.

The transparent polymer may be a polyacrylate, polycarbonate, polyester, polystyrene, styrene-acrylonitrile copolymer ("SAN"), or polyolefin, and the light scattering material may be inorganic, organic or combination of both. The light guide is prepared by polymerizing a mixture containing the appropriate monomer and the light scattering material. Alternately, the desired polymer and the scattering material may be suitably compounded and processed by methods such as, for example, molding, extrusion, casting and the like, to prepare the transparent plate.

BRIEF DESCRIPTION OF THE DRAWINGS

FIG. 1(a) is a graphical representation of the haze of samples prepared from organic fillers as backlighting lightpipe materials versus the wavelength of light ranging from 400 to 740 nm. FIG. 1(b) is a graphical representation of the haze of samples prepared from inorganic fillers as backlighting lightpipe materials versus the wavelength of light ranging from 400 to 740 nm. FIG. 2 is the luminance from the exit surface of the lightpipes described in this invention.

DESCRIPTION OF THE INVENTION

Figure 3A:
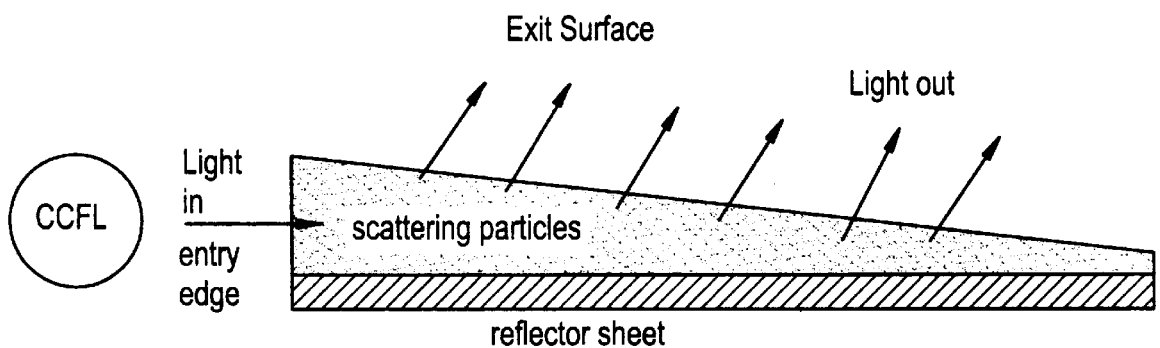
FIG. 3(a) and FIG. 3(b) are schematic side view representations of wedge shaped lightpipes on a reflector sheet containing some embodiments disclosed in the present invention, with FIG. 3(a) showing one wedge shaped lightpipe and FIG. 3(b) showing two wedge shaped lightpipes in intimate contact.

In one embodiment the present invention teaches an improved light guide for backlighting liquid crystal displays. The light guide is made of a transparent polymeric material in which light scattering particles are distributed. The scattering in the lightpipe causes the light beam coming from the CCFL to exceed the critical angle and leave the lightpipe. The term "transparent" refers to the fact that the polymer lets at least 80% of the light from the light source to pass through. "Scattering" refers to the change in direction of a light beam due to its interaction with a particle whose refractive index differs from the matrix polymer and which has a finite diameter. The intensity and direction of scattered light follows well known optical principles as described in the book "The scattering of Light" by M. Kerker ( chapters 3 and 8, Academic Press, New York, 1969). Haze is a common measure of scattering and is described in "Optical properties of Polymers" (Ed. G. H. Meeten, Chapter 5, Elsevier, 1986, Essex, UK). Typical diameters of scattering particles range in size from 0.01 $\mu$m to 10 $\mu$m and refractive index differences Dn are in the range Dn =0.001 to 1.4. The term "critical angle" refers to the internal angle of incidence of a light ray, which when exceeded, the ray leaves the lightpipe. Tapered wedge waveguides that radiate light along the length are described in "Optical Waveguide Theory" by A. W. Snyder and J. D. Love (chapter 5, Chapman and Hall, London, 1983). Unlike the conventional dot pattern to scatter light which is printed outside the surface opposite the exit surface of the light guide, the present invention's scattering particles are inside within the polymer and cause a more efficient scattering of light prior to exiting. The net result is that there is little loss of light and therefore brighter illumination.

Furthermore, since there is no dot pattern in the present invention and therefore no need to hide it, a diffuser is not necessary. However, a diffuser may be used for homogenization of light in order to improve the uniformity of the light across the wavelength range of the light. Generally, the wavelength range is 400–740 nm.

Diffuse scattering plates are widely used as covers for lighting fixtures and also as projection screens for displays. The important requirements for this application are the high transmission of light, the uniform scattering as a function of wavelength to maintain color fidelity, the viewing angle which is determined by the angle distribution of the scattered light and finally the mechanical toughness.

The light guide or light diffusion screen is composed of a transparent polymer and light scattering particles. The size of the particles is important because it determines the angular distribution of scattered light. The particles have average size generally in the range 0.01–10 $\mu$m, preferably 0.04–5 $\mu$m and typically 1–3 $\mu$m. The smaller particles cause a wider distribution of the scattering of light, whereas the larger particles cause mainly forward scattered light. The refractive index difference between the particles and the polymer matrix determines the intensity of scattering. The particles may be inorganic, organic or combination thereof. Examples of suitable inorganic materials are alumina ($Al_2O_3$), silica, silicate, glass fiber and beads, mica, magnesium titanate, calcium titanate, titanium dioxide, strontium titanate, barium neodymium titanate, and barium strontium titanate, magnesium zirconate and the like. Many such materials are commercially available, for example, the A3500® brand alumina from Alcoa, Bauxite, Ark., and $TiO_2$ from DuPont Company, Wilmington, Del. Organic materials suitable for scattering may be polymeric materials as well as elastomers and core shell modifiers. Such materials are compatible with several polymers (that are used for the transparent polymer) and also cause sufficient refractive index disparity to cause scattering of light. Many are commercially available such as, for example, the KRATON® (available from Shell Chemical Company, Houston, Tex.) and SEPTON® (available from Kuraray Co., Tokyo, Japan) brand elastomers, as well as the KANAKE® brand core shell modifier (available from Kanake Texas Corporation, Houston, Tex.). Suitable polymers are polyester, polyacrylate, polystyrene, styrene-acrylonitrile polymers, polycarbonate and polyolefin. If a polymer is chosen, it must be different from the polymer selected for the matrix resin (for the transparent polymer).

The transparent polymer is any polymer transparent to the light such as, for example, polyacrylate, polycarbonate, polystyrene, polyester and polyolefin. Examples of suitable polymer are PMMA (e.g., PLEXIGLAS® brand PMMA from Rohm and Haas Company, Philadelphia, Penna.), MAKROLON® brand polycarbonate from Bayer Aktiengesellschaft, Leverkusen, Germany) and the likely Preferred materials are polyester and polyolefin. Examples of suitable polyester is polyethylene terephthalate ("PET", e.g., the HOSTAGLAS® brand PET from Hoechst Celanese Corporation, Somerville, N.J.). Especially preferred materials are copolymers of a cycloolefin and an acyclic olefin. Such cycloolefin copolymers ("COCs") are well known. See, for example, U.S. Pat. No. 5,087,677 and U.S. Pat. No. 5,324,801. Illustrative cycloolefin monomers are norbornene, tetracyclododecene, bicyclo[2,2,1]hept-2-ene, 1-methylbicyclo[2,2,1]hept-2-ene, hexacyclo[$6,6,1,1^{3,6},1^{10,13},0^{2,7},0^{9,14}$]-4-heptadecene, and the like, and combinations thereof. Illustrative acyclic olefins are ethylene, propylene, butylene, pentene and combinations thereof. A preferred COC is a copolymer of norbornene and ethylene available under the trade name TOPAS™ from Hoechst Aktiengesellschaft, Frankfurt, Germany. Such COCs have high clarity, transparency and good optical and thermal properties suitable for display applications.

The composition for the light guide generally contains the transparent polymer and the light scattering particles in about 85:15 weight ratio respectively, preferably in 95:5 weight ratio and typically in 99.99:0.01 weight ratio. In many cases small amounts of the scattering material are sufficient to cause the desired effect. The mixed composition may be prepared by methods known in the art. In one method, the polymer and the scattering particles may be suitably blended and then by processes such as molding, extrusion and the like, converted into a light guide of suitable shape and size. In another method, the monomer corresponding to the polymer is mixed very well with the scattering particles and the mixture polymerized in a suitable mold under conditions suitable to cause polymerization of the monomer into the desired polymer. Such methods are well known to those skilled in the art.

In a set of illustrative Examples, TOPAS brand COC polymer resin was compounded with inorganic fillers or organic elastomers in various ratios (Table 1). The compounding was done in a suitable extruder and molded into 127 mm×178 mm×3.2 mm plaques by methods known in the molding art. The haze and transmission of the samples were measured as a function of wavelength with a Macbeth Color Eye 7000 (Macbeth Co., Newburgh, N.Y.)) according to ASTM D1003 (published by the American Society of Testing Materials, Philadelphia, Penna., 1994, Vol. 8.01). From the haze data, the average haze was calculated. The impact strength (Notched Izod) of the plaques was measured according to ASTM D256 (published by the American Society of Testing Materials, Philadelphia, Penna., 1994, Vol. 8.01).The luminance efficiency of the light pipe was measured by coupling a 15 mm length CCFL lamp (outer diameter 3 mm, luminance 33,000 Candela/meter$^2$, Stanley Electric Company, Tokyo, Japan), attaching a reflecting film on the back surface and measuring the scattered radiation from the exit surface with a Minolta CS-100 chromameter. The reference was a standard light pipe currently used in LCD consisting of 3 mm thick acrylic sheet with printed dots on the back surface.

demonstrate that the haze could be varied with samples and that the average haze was substantially constant over the 400–740 nm wavelength range. Such an independence of the average haze versus wavelength is surprising since most scattering materials generally scatter stronger in the blue than in the red wavelengths. Thus the present result is highly beneficial to preserving the fidelity of colors of the CCFL and projection screens.

Furthermore, the overall light scattering efficiency of the plaques as a lightpipe material was measured by coupling light from the CCFL through the entry edge of the plaques and placing a reflector at the back of the plaques. The luminance through the exit surface was measured as a function of the distance from the CCFL. The results for the different examples in Table 1 are shown in FIG. 2. High efficiency of backlighting could be demonstrated with these samples. Coupled with the substantial independence of scattering and haze with wavelength and high impact strength, the present invention offers substantially improved compositions and lightpipes suitable for backlighting LCD applications.

In another embodiment, the invention offers a unique way to reduce or eliminate the decreasing of light scattering as light travels through a backlight pipe. In a typical lightpipe construction, a parallel faced slab lightpipe is used. The scattering tends to decrease exponentially with distance from the CCFL. However, for most applications the scattered light has to be homogeneous and even across the lightpipe. The present invention offers a unique way of accomplishing that way of utilizing a wedge shaped lightpipe (FIG. 3(a)) with typical thickness varying from about 4 mm at the CCFL end to about 1 mm at the other end where the lightpipe comprises the scattering material of the present invention described above. The use of such wedge shaped lightpipe made of the above-described scattering material

TABLE 1

| Example | composition* (TOPAS ™ +) | impact strength notched Izod (ft-lb/in) | average haze (%) Thickness = 3.2 mm | transmission (%) @ 500 nm, Thickness = 3.2 mm | Relative luminance efficiency** |
|---|---|---|---|---|---|
| 1 | 5% Kraton D1116 elastomer | 1.1 | 31.5 | 85 | 0.995 |
| 2 | 2% Kanake M511 core shell modifier | 0.5 | 39 | 82 | 1.09 |
| 3 | 0.02% Alcoa A3500 Al2O3 | 0.5 | 23 | 84 | 0.463 |
| 4 | 0.07% Nanotek Al2O3 | 0.5 | 15 | 83 | 0.783 |
| 5 | 0.002% Dupont TiO2 | 0.5 | 15 | 75 | 1.145 |
| 6 | 0.05% Alcoa A3500 Al2O3 | 0.5 | 43 | 80 | na |
| 7 | TOPAS ™ 6013 (no additive) | 0.5 | 0.5 | 92 | 1 |

*Composition percentages are weight %. The base matrix resin is TOPAS ™ 6013 in all the Examples.
**Relative Luminance efficiency is defined as the total luminance exiting from the surface of the lightpipe divided by the total luminance from a clear acrylic sheet lightpipe reference, tested under the same conditions. The reference acrylic sheet has impact strength of 0.3 ft-lb/in, optical haze of 0.5% and transmission of 92%

The results in Table 1 and FIG. 1 (a) illustrate that the inventive light diffusion plates have improved impact strength over the base resin of TOPAS and high optical transmission and their scattering haze is substantially independent of wavelength. The results (FIG. 1(a) and (b))

will lead to uniform illumination and uniform scattering that is substantially independence of wavelength. The presence of the wedge shape decreases the critical angle as the distance from the CCFL increases, so that the internally reflected and scattered light can leave the wedge more readily the farther it is from the CCFL lamp. This will result in a more homogenous luminance of light from the exit surface.

Figure 3B:
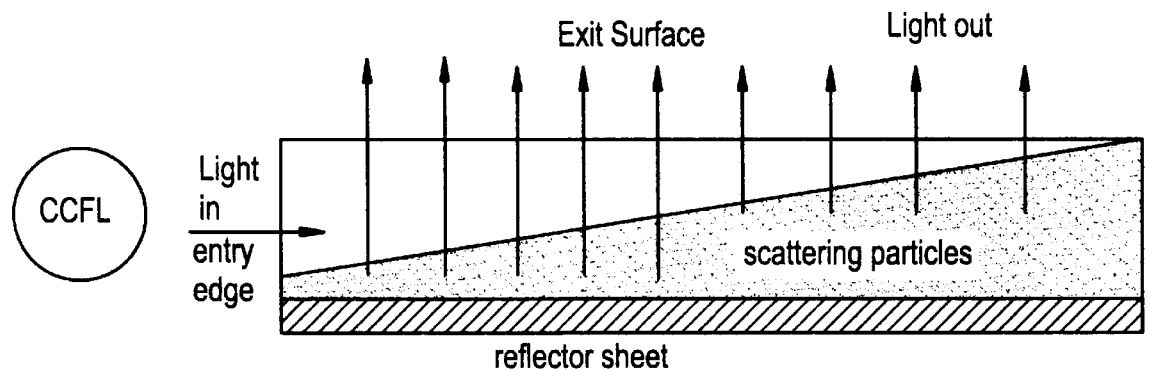

Yet another method to improve homogeneity of scattering in the lightpipe is envisioned by varying the concentration of the scattering material such that it is lower at the entry edge near the CCFL and higher near the exit surface. This makes the scattering uniform. This is accomplished by having two wedge shaped lightpipes in intimate contact with each other as shown in FIG. 3(b) wherein one wedge shaped lightpipe contains the scattering centers and the other does not contain any. Such an arrangement adjusts the concentration of scattering centers as a function of the distance from the CCFL thereby resulting in the generation of homogeneously scattered light.

Another embodiment of the present invention contemplates a light diffusion plate comprising the composition of the invention. Light diffusion plates are described, for example, in the Japanese Patent 6-279604 noted above. Such light diffusion plates may be constructed with the inventive composition which comprises a combination of transparent polymer and scattering materials described above. In such a plate, light from a suitable source will scatter substantially uniformly over the wavelength range 400–740 nm, the light exiting the plate will be substantially uniform in brightness and the plate will also have a high impact strength.

What is claimed is:

1. A light guiding device suitable for display applications comprising: (a) a light source and (b) a light guide having an entry edge for light to enter and an exit surface for light to exit, with said light source positioned at said entry edge, wherein said light guide comprises a transparent polymer and a light scattering material with said light scattering material having refractive index different from that of said transparent polymer, and wherein light from said light source scatters substantially internally within said light guide prior to exiting through said exit surface, with said scattering occurring substantially uniform over the wavelength range 400–740 nm, further wherein said light exiting through said exit surface is substantially uniform in brightness and still further wherein said light guide has an impact resistance of at least 0.5 ft-lb per inch.

2. The device of claim 1, wherein said polymer is selected from the group consisting of polyester, polycarbonate, polyacrylate, polystyrene, styrene-acrylonitrile copolymer, and polyolefin.

3. The device of claim 2, wherein said polyolefin is a polymer comprising a cycloolefin moiety.

4. The device of claim 3, wherein said polymer is a cycloolefin copolymer.

5. The composition of claim 4, wherein said copolymer is a copolymer of a cycloolefin with one or more acyclic olefins.

6. The composition of claim 5, wherein said cycloolefin is selected from the group consisting of norbornene, tetracyclododecene, bicyclo[2,2,1]hept-2-ene, 1-methylbicyclo[2,2,1]hept-2-ene, hexacyclo[6,6,1,1$^{3,6}$,1$^{10,13}$,0$^{2,7}$,0$^{9,14}$]-4-heptadecene, and mixtures thereof.

7. The composition of claim 4, wherein said acyclic olefin is selected from the group consisting of ethylene, propylene, butylene, pentene and combinations thereof.

8. The device of claim 2, wherein said polymer is a polyester.

9. The device of claim 8, wherein said polyester is polyethylene terephthalate.

10. The device of claim 8, wherein said polyester is further modified with a different polyester.

11. The device of claim 1, wherein said scattering material is organic, inorganic or mixtures thereof.

12. The device of claim 11, wherein said inorganic scattering material is selected from the group consisting of alumina, silica, titanium dioxide, silicate, glass fiber and beads, mica, magnesium titanate, calcium titanate, strontium titanate, barium neodymium titanate, barium strontium titanate, magnesium zirconate and combinations thereof.

13. The device of claim 11, wherein said organic scattering material is selected from the group consisting of polyacrylate, polyester, polycarbonate, polystyrene, polystyrene acrylonitrile and polyolefin.

14. The device of claim 1, wherein said transparent polymer and said light scattering material are present in said light wave in a 85:15 weight ratio.

15. The device of claim 1, wherein said transparent polymer and said light scattering material are present in said light wave in a 95:5 weight ratio.

16. The device of claim 1, wherein said transparent polymer and said light scattering material are present in said light wave in a 99.99:0.01 weight ratio.

17. The device of claim 1, wherein said scattering material has particle size in the range 0.01–10 μm.

18. The device of claim 1, wherein said scattering material has particle size in the range 0.04–5 μm.

19. The device of claim 1, wherein said scattering material has particle size in the range 1–3 μm.

20. The device of claim 1, wherein said light guide is molded from said transparent polymer and said scattering material.

21. The device of claim 1, wherein said light guide is extruded from said transparent polymer and said scattering material.

22. The device of claims 1, wherein said scattering material is substantially uniformly distributed within said transparent polymer in said light guide.

23. The device of claim 1, wherein said scattering material varies in distribution within said transparent polymer in said light guide.

24. The device of claim 1, wherein said light guide is a parallel faced slab lightpipe.

25. The device of claim 1, wherein said light guide is a wedge shaped lightpipe.

26. The device of claim 25, wherein said light guide further comprises a second wedge shaped light pipe in intimate contact therewith.

27. The device of claim 25, wherein said wedge shaped light pipe is thicker at its end closer to said light source and thinner at the end farther removed from said light source.

28. The device of claim 26, wherein one wedge shaped light pipe contains light scattering particles, and the other wedge shaped light pipe lacks scattering particles.

* * * * *